United States Patent [19]
Romanenko et al.

[11] 3,941,691
[45] Mar. 2, 1976

[54] METHOD OF BIOLOGICAL PURIFICATION OF INDUSTRIAL EFFLUENTS FROM CHROMATES AND BICHROMATES

[76] Inventors: Vitaly Ivanovich Romanenko, Nekouzsky raion, p/o Borok, 36, kv. 21, Yaroslavskaya oblast; Sergei Ivanovich Kuznetsov, Volkhovsky pereulok, 21, kv. 1; Vladimir Nikolaevich Korenkov, Samarkandsky bulvar, 32, korpus 1, kv. 51, both of Moscow, all of U.S.S.R.

[22] Filed: Oct. 4, 1974

[21] Appl. No.: 512,328

[30] Foreign Application Priority Data
Nov. 20, 1973 U.S.S.R.............................. 1971152

[52] U.S. Cl. .................................................. 210/2
[51] Int. Cl.$^2$.......................................... C02B 5/10
[58] Field of Search ....................... 210/2, 11; 195/3

[56] References Cited
UNITED STATES PATENTS
3,755,156  8/1973  Yakovlev et al......................... 210/5

*Primary Examiner*—Thomas G. Wyse
*Attorney, Agent, or Firm*—Steinberg & Blake

[57] ABSTRACT

A method of biological purification of industrial effluents from chromates and bichromates, wherein industrial effluents are mixed with domestic sewage and then the chromates and bichromates contained therein are biochemically reduced under anaerobic conditions using a strain of *Bacterium dechromaticans* Romanenko B-1167 microorganism, selected by repeated seeding on liquid nutrient medium containing sources of carbon, nitrogen, phosphorus, under anaerobic conditions, in the presence of potassium chromate in the function of oxygen donor, followed by separation from the seeding on a meat-infusion agar under aerobic conditions without chromate, the strain having the following morphological features and physiological properties: small bacilli of about 1.2 micron long and 0.4 micron wide, forms rows when spread over a glass plate, sometimes at an angle to each other; forms no spores; Gramm negative; under anaerobic conditions with chromates they grow as single bacilli or in the form of short chains; immobile; under aerobic conditions they grow in a meat-infusion agar; the colonies are small in the beginning, in the form of dew droplets, watery, glittering, with even edges, they further become light pinkish and the colonies grow in size, the centre of the colony is elevated; in the bulk of agar they grow as small lenses; at the edge of the meat-infusion agar the colonies are small, then they join together to form a streak, the tint is slightly pinkish, then it is milky white with a slight pinkish tint, the streak is opalescent, flat, paste-like; grows on gelatine without diluting the latter in the form of a pale streak, the growth rate is very slow, the streak is slightly pinkish; grows on potato as a colliculus streak, the colour is pinkish or reddish, grows slowly, the streak is firm, colliculus; does not grow on glucose, lactase or cellular tissue; grows on sucrose, maltose, mannite, decomposes starch, grows well on ethyl alcohol forming acid; slightly peptonizes milk; does not reduce nitrates; assimilates small quantities of $CO_2$; reduces chromates and bichromates to chromic hydroxide at a rate of 2.1 gram of potassium chromate during a period of three days per gram of dry biomass matter.

2 Claims, No Drawings

METHOD OF BIOLOGICAL PURIFICATION OF INDUSTRIAL EFFLUENTS FROM CHROMATES AND BICHROMATES

The present invention relates to the art of waste water treatment and more specifically to a method of biological purification of industrial effluents from chromates and bichromates that can find application in the machine-building, instrument-building, radio-engineering and other industries.

The effluents of these industries are toxic owing to the fact that they contain chromates and bichromates, with the result that they cannot be discharged into water basins without prior decontamination.

Known in the art is a method for purification of mine effluents with the help of microorganisms, the effluents containing bound oxygen in the form of sulfates. In this case $SO_4^{-2}$ is removed with the aid of sulfate-reducing bacteria Desulfovibro desulfuricans, by reducing to hydrogen sulfide under anaerobic conditions, the hydrogen sulfide reacting with iron to settle in the form of sulfide. The source of carbon and energy for these bacteria is provided by the decomposition products of sawdust owing to the metabolism of heterothropic microorganisms.

Desulfovibro desulfuricans bacteria are not capable of reducing chromates and bichromates and therefore they cannot be used for the purification of chromates- and bichromates-containing industrial effluents.

Known in the art is a method for biochemical treatment of industrial effluents containing bound oxygen in the form of inorganic compounds of hexavalent chromium, chlorine or a mixture thereof, wherein said industrial effluents are mixed with domestic sewage containing organic wastes, followed by biochemical reduction of oxygen-containing inorganic compounds of chromium and chlorine under anaerobic conditions with active sludge, with simultaneous oxidation of the organic matter contained in the domestic sewage (cf. U.S. Pat. No. 3,755,156).

A disadvantage of the above-mentioned method resides in the low rate of chromate and bichromate reduction by active sludge (3.0 to 4.0 mg of chrome per gram of dry active sludge per hour).

It is an object of the present invention to obviate the above disadvantages.

The object was achieved in a method for biologic treatment of industrial effluents from chromates and dichromates wherein industrial effluents are mixed with domestic sewage and the chromates and bichromates present therein are reduced under anaerobic conditions, followed by separation of purified water, wherein according to the invention the biologic reduction of chromates and bichromates is carried out with the aid of Bacterium dechromaticans microorganism, Romanenko B-1167 strain, obtained selectively by repeated reseeding on a liquid nutrient medium containing sources of carbon, nitrogen, phosphorus, under anaerobic conditions, in the presence of potassium chromate in the function of an oxygen donor, followed by separation from the meat-infusion agar under anaerobic conditions without chromate, which strain has the following morphological features and physiological properties: small bacilli of about 1.2 micron long and 0.4 micron wide, forms rows when spread over a glass plate, sometimes at an angle to each other; forms no spores; Gram-negative; under anaerobic conditions with chromates they grow as single bacilli or in the form of short chains, immobile; under aerobic conditions they grow in meat-infusion agar; the colonies are small in the beginning, in the form of dew drops, watery, glittering, with even edges, they further become light pinkish and the colonies grow in size, the centre of the colony is elevated; in the bulk of agar they grow as small lenses; at the edge of the meat-infusion agar the colonies are small, then they join together to form a streak; the shade is slightly pinkish, then it is milk white with a slight pinkish tint, the streak is opalescent flat, paste-like; grows on gelatine without diluting the latter, in the form of a pale streak, the growth is very slow, the streak is slightly pinkish; grows on potato as a colliculus streak, the colour is pinkish or reddish, grows slowly, the streak is firm, colliculus; does not grow on glucose, lactase, or cellular tissue; grows on sucrose, maltose, mannite, decomposes starch, grows well on alcohol, ethyl forming acid; slightly peptonizes milk; does not reduce nitrates; assimilates small quantities of $CO_2$; reduces chromates and bichromates to chromic hydroxide at a rate of 2/g of potassium chromate for three days per gram of dry biomass matter.

The proposed strain of Bacterium dechromaticans Romanenko B-1167 is deposited in the Institute of Microbiology of the Academy of Science of the USSR, No. B-1167.

The strain Bacterium dechromatocans Romanenko B-1167 is preferably introduced into a mixture of industrial effluents and domestic sewage in amounts of from 3 to 7 g/l, based on dry biomass matter, the process being carried out with said microorganism maintained in a suspended state.

The method according to the present invention is effected as follows. The industrial effluents to be treated which contain chromates and bichromates are delivered to an averaging reservoir wherein the content of chromium in the effluent is averaged, then the effluents are continuously fed to a sealed receiving vessel (boilogical reducer). The domestic sewage is first fed to a settler where large suspended matter settles to the bottom and the clarified sewage is continuously fed to the sealed receiving vessel (biological reducer). The amount of industrial effluents and domestic sewage entering the sealed receiving vessel is adjusted so as to have the amount of easily oxidized organic matter (on the basis of the BOD thereof) introduced with the domestic sewage at least 1.2 times higher than the amount of bound oxygen in the chromate or bichromate introduced together with the industrial effluents. The capacity of the sealed reservoir (biological reducer) is calculated based on the time required for the chromate or bichromate to be biologically reduced. From the settler, the Bacterium dechromaticans Romanenko B-1167 is continuously fed into the sealed reservoir in amounts sufficient for the concentration of enriched culture to be maintained in the biological reducer to within 3 to 7 g per liter based on dry biomass matter. The mixture thus obtained of industrial effluents and domestic sewage together with the Bacterium dechromaticans Romanenko B-1167 culture is continuously stirred in the absence of air oxygen, then it is continuously fed to a settler tank where the Bacterium dechromaticans Romanenko B-1167 culture will settle, and the clear water free from chromates and bichromates is discharged. The required amount of the Bacterium dechromaticans Romanenko B-1167 is continuously pumped to the biological reducer.

Application of the *Bacterium dechromaticans* Romanenko B-1167 culture permitted the process of purification of industrial effluents from chromates and bichromates to be intensified owing to the increased rate of reduction of chromates and bichromates, which is 3 to 9 times higher than that offered by any known prior art process, thus reducing the time required for industrial effluents to be treated, and the required capacity of the equipment as well.

The process of biological reduction of chromates and bichromates with the *Bacterium dechromaticans* Romanenko B-1167 microorganisms proceeds at a very fast rate and will be complete provided the amount of easily oxidized organic matter characterized by the BOD value (biological oxygen demand) exceeds the amount of bound oxygen in the chromates and bichromates at least by a factor of 1.2. The rate of chromate and bichromate reduction is up to 30 g (as chrome) per gram of dry biological mass matter per hour.

The invention will now be explained in greater detail with reference to the following examples of effecting the present method of treating industrial effluents to remove chromates and bichromates.

EXAMPLE 1

Industrial effluents containing potassium chromate are fed to an averaging receiving vessel, from which at a chromium concentration of 200 mg/l (250 mg/l oxygen concentration) it is pumped to a biological reducer at a rate of 266 l/hr.

The domestic sewage is first directed to a settler and the clarified sewage having 180 mg/l BOD are pumped to the biological reducer at a rate of 534 l/hr. The concentration of potassium chromate in the mixture of industrial effluents and domestic wastes is 83 mg/l of oxygen, the biological oxygen demand being 120 mg/l. An enriched *Bacterium dechromaticans* Romanenko B-1167 culture is continuously pumped into the biological reducer. The concentration of said culture in the biological reducer is 4.2 g/l, counting by dry biological mass matter. The residence time of the mixture of industrial effluents, domestic sewage and said culture of *Bacterium dechromaticans* Romanenko b-1167, when constantly stirred with mechanical stirrers in the biological reducer in the absence of air oxygen ingress is 1.5 hours, based on 1.8 cubic meter of the biological reducer volume. During this time the hexavalent chromium present in the biological reducer will be completely reduced to trivalent chromium, in the form of chromic hydroxide. The mixture of water, culture and hydroxide from the biologic reducer continuously flows by gravity to a thickener, where the solids precipitate and said culture and chromic hydroxide are separated, while the water, purified from the potassium chromate is discharged. The rate of potassium chromate reduction (as chromium) is 11 mg per gram of dry matter of the culture per hour.

EXAMPLE 2

Into a sealed vessel there is introduced one liter of a medium having the following composition: $NH_4Cl$ — 0.3 g; $K_2HPO_4$ — 0.3 g; $KH_2PO_4$ — 0.5 g.; $MgSO_4 \cdot 7H_2O$ — 0.1 g.; NaCl — 0.1 g.; $CaCO_3$ — 0.05 g.; $FeCl_3 \cdot 6H_2O$ — 0.05 g.; sodium acetate — 0.2 g.; microelements to Hogland — 0.5 ml. Vitamin $B_{12}$ — 10 microgram; meat-infusion agar — 100 kl.; water from a water basin, filtered through a paper filter — up to 1000 ml.; 110 mg. of potassium bichromate (as chromium); 5 g of pure culture of *Bacterium dechromaticans* Romanenko B-1167, and the content of said vessel is kept for 40 minutes while continuously stirring with a mechanical stirrer under anaerobic conditions, i.e. without air oxygen ingress. Thereafter the stirrer is stopped and the culture of *Bacterium dichromaticans* Romanenko B-1167 is allowed to settle in the vessel. Then the clarified water, purified from bichromate, is removed by syphoning. During this period the concentration of potassium bichromate (as chromium) is reduced to zero. The rate of potassium bichromate reduction is 2.1 g. of potassium bichromate for three days per gram of dry culture biomass, or 30 mg. (as chromium) per gram of dry culture biomass per hour.

What we claim is:

1. A method of biological purification of industrial effluents from chromates and bichromates which comprises mixing industrial effluents containing chromates and bichromates with domestic sewage waters, contacting the thus obtained mixture of waste waters with a culture of *Bacterium decromaticans* Romanenko B-1167 microorganism and maintaining the resulting mixture under anaerobic conditions until substantially complete reduction of the chromates and bichromates to chromium hydroxide, and separating said culture from the purified water.

2. A method as claimed in claim 1, wherein the strain *Bacterium dechromaticans* Romanenko B-1167 is introduced into a mixture of industrial effluents and domestic sewage in amounts of from 3 to 7 gram per liter, based on dry biomass matter, and the process is carried out by maintaining the microorganisms in a suspended state.

* * * * *